Patented Mar. 20, 1923.

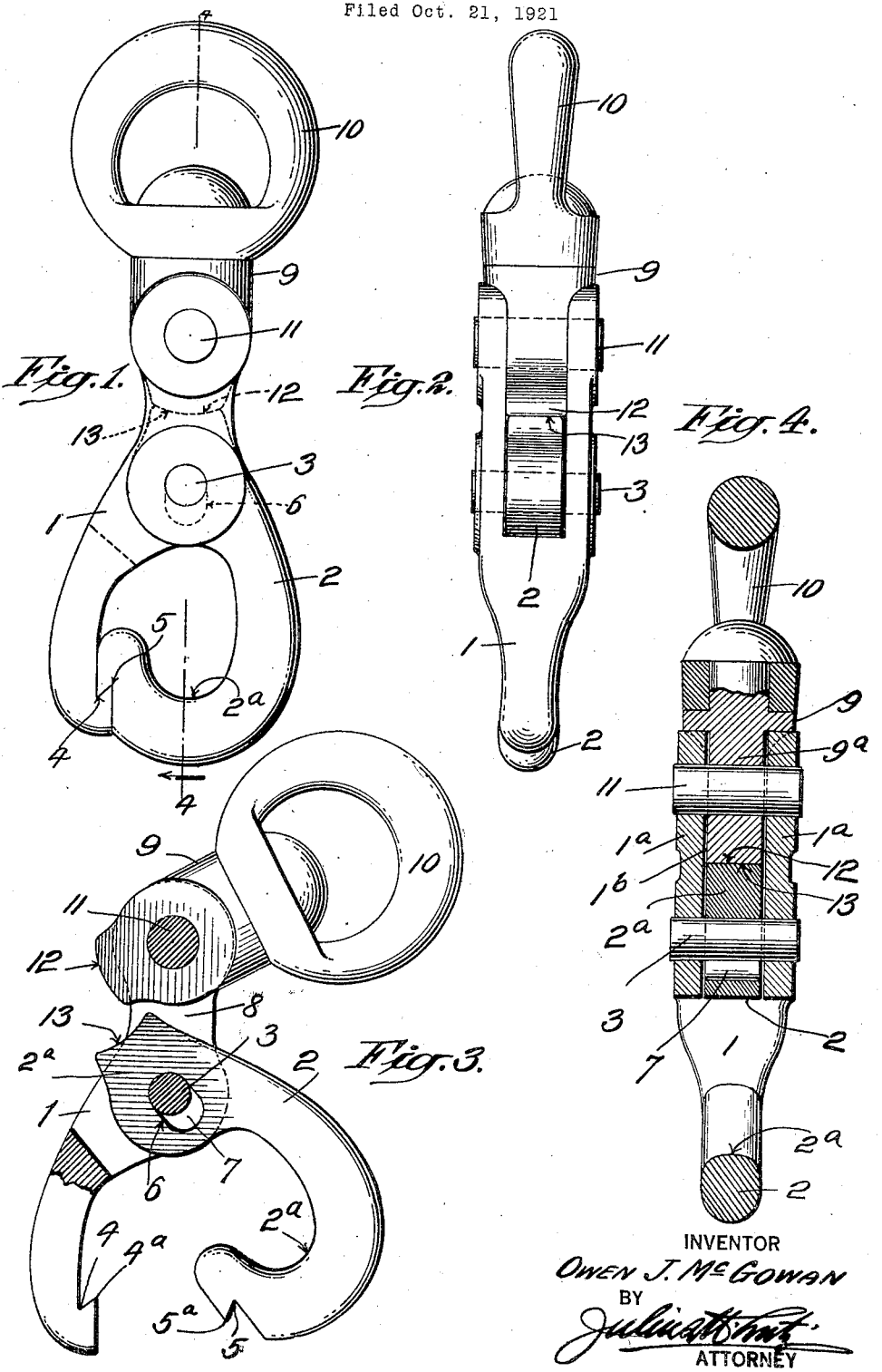

1,449,364

UNITED STATES PATENT OFFICE.

OWEN J. McGOWAN, OF BROOKLYN, NEW YORK, ASSIGNOR TO WINIFRED WILSON, OF BROOKLYN, NEW YORK.

CARGO HOOK.

Application filed October 21, 1921. Serial No. 509,309.

*To all whom it may concern:*

Be it known that I, OWEN J. McGOWAN, a citizen of the United States, and a resident of the borough of Brooklyn, city of New York, in the county of Kings and State of New York, have invented certain new and useful Improvements in Cargo Hooks, of which the following is a specification.

This invention relates to improvements in cargo hooks, and particularly is an improvement upon the type of hook patented in Letters Patent #1,308,549, issued to me July 1st, 1919, and in my application for Letters Patent Serial No. 449,365, filed March 3d, 1921.

One of the objects of my present invention is to produce a hook of the type specified in said Letters Patent and application which will be adapted for use as a cargo hook under varying conditions of use and with varying types of tackle and which will greatly increase the factor of safety in the use of cargo hooks.

Another object of my invention is to provide a closed cargo hook, the parts of which will close over and lock a sling chain or other equivalent device within the hook, so as to eliminate all unsafe mousing of the hook and which will, when the parts are placed in locking position, cause the hook to be retained in locked position on the sling chain or the like by the strain of the load, so as to prevent the accidental release of the sling chain or the like until the load is safely landed and the strain thereof relieved.

Another object of my invention is to produce a hook which may be secured to a load in locking position and which will without further manipulation be automatically locked by the movement or lifting of the tackle and will be retained in such locked position by the strain of the load so that it cannot be unlocked until the strain of the load is first relieved.

Another object of my invention is to provide a cargo hook of the type above specified which is capable of manual release only after the strain of the load has been relieved and the tackle has been moved, swung laterally or overhauled to unlock the parts.

Another object of my invention is to produce a hook which is capable of being readily and easily handled by unskilled labor; which may be readily, quickly and easily secured to a load and moved to locked position; and which when initially secured to a load in such locked position will be firmly retained in such locked position by the strain of the load and cannot be released until, first, the strain of the load is relieved, and second, the tackle block is swung laterally or overhauled to permit the parts to be moved to unlocked position, after which the parts of the hook may be manually unlocked or released.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a side elevation of a cargo hook embodying my invention shown in locked position;

Fig. 2 is an end elevation of the said hook in the position shown in Fig. 1;

Fig. 3 is a side elevation partly in section of my improved hook shown in unlocked and released position; and Fig. 4 is a vertical section on the line 4—4 of Fig. 1, looking in the direction of the arrow.

Referring now to these drawings, which illustrate a preferred embodiment of my invention, my improved cargo hook comprises a body portion 1 and a hook portion 2 having the usual load seat $2^a$, which is pivotally movable into and out of locking contact with the body portion, and as shown is pivoted on such body portion by means of a pivot pin 3. As illustrated, the body and hook parts have an independent relative sliding movement in order to permit interengagement and releasing of cooperating locking notches 4 and 5 provided respectively on said body and hook portions. The notch 4 is formed on the inner surface of the lower end 1 of the body portion and has the conformation of an acute downwardly and inwardly extending angle, so as to provide a locking tooth $4^a$, while the notch 5, which is of similar conformation, is formed on the outer surface of the hook portion 2 and provides a locking tooth $5^a$. The relative sliding movement between the body and hook portions is preferably procured by elongating the pivot bearing hole 6 and providing a sliding space 7 in the hook portion 2 below the pivot 3, and also a sliding space 8 in the body portion above the hook, so that the hook may slide up and down on the pivot 3 when the parts are in unlocked position.

In the present embodiment of my invention, the body and hook parts, when placed with the locking notches into interengagement, may be securely locked against such independent sliding movement and a consequent releasing movement of such parts by a movement of an attaching member 9 which in the embodiment shown comprises a tackle post and carries a tackle ring 10. The attaching member or tackle post 9 is, as shown, pivotally movable on the pivot 11 fixed in the upper end of the body portion 1 and carries at its lower end a locking projection 12 which, when the body and hook portions are in locking position, is adapted to be swung over and into engagement, as illustrated in Fig. 1, with a seat 13 on the hook portion so as to effectively block any sliding movement of the hook portion in relation to the body portion and prevent an accidental disengagement of the interlocking teeth 4ª—5ª.

As illustrated, the projection 12 and seat 13 both have rounded surfaces, one being convex and the other concave, and the projection 12, when the attaching member or tackle post 9 is swung on its pivot 11, will closely abut against the seat 13 and effectively lock the body and hook portions 1 and 2 respectively into interengaging position.

As illustrated, the body portion 1 is hollowed out to provide a housing with side walls 1ª—1ª and a space 1ᵇ therebetween within which reduced portions 2ª—9ª of the hook and attaching member respectively fit and swing on the pivots 3 and 11 respectively.

This construction enables a strong and solid hook to be constructed and also protects the parts from the weather.

Having described my invention, I claim:—

1. A releasing hook embodying, in combination, a body portion, a hook portion, said parts being relatively movable pivotally into contact with each other and also having independent relative movement for locking and releasing such contacting parts; and an attaching member mounted on one of such portions and movable pivotally into contact with the other portion to lock the portions against relatively independent movement and retain such parts in interengagement.

2. A releasing hook embodying, in combination, a body portion, a hook portion, said parts being relatively movable pivotally into contact with each other and also having independent relative movement for locking and releasing such contacting parts; and an attaching member having a locking abutment and mounted on one of such portions and movable pivotally into contact with the other portion to lock the portions against relative independent movement and retain such parts in interengagement.

3. A releasing hook embodying, in combination, a body portion, a pivot carried thereby, a hook portion movable pivotally on said pivot into contact with the body-portion and also having relative sliding movement in relation to said body portion for locking and releasing said parts; another pivot carried by said body portion and an attaching member pivoted on said last mentioned pivot and having a locking abutment movable into contact with the hook portion to retain the hook parts in locking engagement.

4. A releasing hook embodying, in combination, a body portion, a hook portion movable pivotally into contact with the body portion and also having a relative sliding movement in relation to said body portion for locking and releasing said parts and pivotally movable means for fastening said parts against sliding movement comprising a tackle post pivotally mounted within the body portion having a locking abutment movable into contact with the hook portion to lock the parts against relative sliding movement.

5. A releasing hook embodying, in combination, a tackle-attaching member, a body portion pivotally connected to such attaching member, a hook portion movable pivotally into engagement with the body portion and also having a relative sliding movement in relation to said body portion for locking and releasing said body and hook parts and a projection carried by said tackle member for fastening said body and hook parts against sliding movement.

6. A releasing hook embodying, in combination, a tackle-attaching member; a body portion pivotally mounted on said attaching member; a hook portion, said body and hook parts being movable pivotally into contact with each other and also having a relative sliding movement for locking and releasing said contacting body and hook parts; interengaging means for releasably latching said body and hook portions together and a locking projection carried by said attaching member for fastening the said parts against sliding movement and locking the same together.

In witness whereof, I have signed my name to the foregoing specification in the presence of two subscribing witnesses.

OWEN J. McGOWAN.

Witnesses:
HELEN V. WHIDDEN,
JOSEPH F. O'BRIEN.